United States Patent
Kato et al.

(10) Patent No.: US 7,569,306 B2
(45) Date of Patent: Aug. 4, 2009

(54) ALKALINE BATTERY AND MANUFACTURING METHOD OF POSITIVE ELECTRODE MATERIAL THEREFOR

(75) Inventors: Fumio Kato, Osaka (JP); Katsuya Sawada, Osaka (JP); Tadaya Okada, Osaka (JP); Yasuo Mukai, Osaka (JP); Shigeto Noya, Osaka (JP)

(73) Assignee: Panasonic Corporation, Osaka (JP)

( * ) Notice: Subject to any disclaimer, the term of this patent is extended or adjusted under 35 U.S.C. 154(b) by 533 days.

(21) Appl. No.: 11/587,206

(22) PCT Filed: Mar. 24, 2005

(86) PCT No.: PCT/JP2005/005392

§ 371 (c)(1),
(2), (4) Date: Oct. 23, 2006

(87) PCT Pub. No.: WO2005/104272

PCT Pub. Date: Nov. 3, 2005

(65) Prior Publication Data

US 2007/0212612 A1 Sep. 13, 2007

(30) Foreign Application Priority Data

Apr. 23, 2004 (JP) ............................. 2004-128533

(51) Int. Cl.
    H01M 4/52 (2006.01)
    H01M 4/08 (2006.01)
(52) U.S. Cl. ..................................... 429/223; 429/206
(58) Field of Classification Search ....................... None
    See application file for complete search history.

(56) References Cited

U.S. PATENT DOCUMENTS

2003/0134199 A1 * 7/2003 Christian et al. ............ 429/223

FOREIGN PATENT DOCUMENTS

| JP | 55-030133 | 3/1980 |
|----|-----------|--------|
| JP | 57-072266 | 5/1982 |
| JP | 60-131765 | 7/1985 |
| JP | 02-030061 | 1/1990 |
| JP | 10-214621 | 8/1998 |
| JP | 2001-015106 | 1/2001 |
| JP | 2001-043855 | 2/2001 |
| JP | 2001043855 A * | 2/2001 |
| JP | 2002-008650 | 1/2002 |
| JP | 2002-075354 | 3/2002 |
| JP | 2002-203546 | 7/2002 |
| JP | 2002-289187 | 10/2002 |
| WO | WO 97/19479 | 5/1997 |

* cited by examiner

Primary Examiner—Melvin C Mayes
Assistant Examiner—James Corno
(74) Attorney, Agent, or Firm—McDermott Will & Emery LLP

(57) ABSTRACT

An alkaline battery of the present invention includes a positive electrode material mixture including nickel oxyhydroxide. The nickel oxyhydroxide includes a secondary particle with a crystal structure mainly composed of γ-type at least a portion of the surface layer of the secondary particle, and with a crystal structure mainly composed of β-type in the inner portion of the secondary particle. Based on the present invention, the advantage of the alkaline battery, i.e., excellence in discharge performance under high-load, can be kept and the conventional problem of storage characteristics can be improved.

8 Claims, 1 Drawing Sheet

ALKALINE BATTERY AND MANUFACTURING METHOD OF POSITIVE ELECTRODE MATERIAL THEREFOR

RELATED APPLICATION

This application is a national phase of PCT/JP2005/005392 filed on Mar. 24, 2005, which claims priority from Japanese Application No. 2004-128533 filed on Apr. 23, 2004, the disclosures of which Applications are incorporated by reference herein. The benefit of the filing and priority dates of the International and Japanese Applications is respectfully requested.

TECHNICAL FIELD

The present invention relates to primary alkaline batteries such as nickel-manganese batteries and nickel dry batteries, which include nickel oxyhydroxide as an active material in the positive electrode material mixture.

BACKGROUND ART

Alkaline dry batteries have an inside-out structure, including a positive electrode case also functioning as a positive electrode terminal, cylindrical positive electrode material mixture pellets disposed to closely contact the positive electrode case, and a gelled zinc negative electrode disposed in the center of the positive electrode pellets with a separator interposed therebetween. The positive electrode material mixture is mainly composed of manganese dioxide. With recent spread of digital devices, an electric load of those devices in which these batteries are used has been increasing gradually, leading to a demand for batteries excellent in high-load discharge performance.

Responding to the demand, Patent Document 1 proposed mixing nickel oxyhydroxide in the positive electrode material mixture for a battery excellent in discharge performance under high-load. Nowadays, such batteries including nickel oxyhydroxide in the positive electrode material mixture are in actual use and are widespread.

For nickel oxyhydroxide for the above alkaline battery, generally, a spherical or egg-shaped nickel hydroxide that has been used for alkaline storage batteries, as in Patent Document 2, is oxidized with an oxidizing agent such as a sodium hypochlorite aqueous solution for the usage. For the raw material spherical nickel hydroxide, β-type with a high bulk density (tap density) is used, and this is converted to β-type spherical nickel oxyhydroxide by a treatment with an oxidizing agent, aiming for a further dense filling of the nickel oxyhydroxide in the battery. At this time, for the purpose of increasing the positive electrode capacity (utilization) in the battery, as shown in Patent Document 3 for usage in alkaline storage batteries, a nickel hydroxide solid solution containing cobalt, zinc, and the like in its crystal under solid-solution state is sometimes used as a starting material. Recent proposals for nickel oxyhydroxide used in primary batteries include spherical one (Patent Document 4), a solid solution including zinc (Patent Document 5), and a solid solution including zinc and cobalt (Patent Document 6). Those are basically application of known technologies of positive electrode material for alkaline storage battery as noted in the above to usage in primary batteries.

Such alkaline batteries in which nickel oxyhydroxide is mixed into the positive electrode material mixture have significant problems: storage characteristics are poor and especially when stored under high temperatures, self-discharge in positive electrode is significant compared with those alkaline batteries not including nickel oxyhydroxide. For improvement in view of such problems as well, technologies of alkaline storage battery are largely applied. For example, there is proposed retarding the self-discharge by adding ZnO and $Y_2O_3$ to positive electrode material mixture (Patent Document 7), and there is proposed retarding the self-discharge by adding an oxide of rare earth elements such as $Yb_2O_3$ and $Er_2O_3$ to the positive electrode material mixture (Patent Document 8). Also, since nickel oxyhydroxide with a higher valence (γ-type structure) shown in Patent Documents 9 and 10 tends to have a lower oxidation-reduction potential than β-type, as an improvement in storage characteristics different from those of Patent Documents 7 and 8, a method by using such nickel oxyhydroxide with a higher valence may be considered. Usage of such nickel oxyhydroxide with a higher valence retards the decomposition reaction of water (oxygen-generative reaction) in the positive electrode, and improves storage characteristics.

[Patent Document 1] Japanese Laid-Open Patent Publication No. Sho 57-72266

[Patent Document 2] Japanese Examined Patent Publication No. Hei 4-80513

[Patent Document 3] Japanese Examined Patent Publication No. Hei 7-77129

[Patent Document 4] Japanese Laid-Open Patent Publication No. 2002-8650

[Patent Document 5] Japanese Laid-Open Patent Publication No. 2002-75354

[Patent Document 6] Japanese Laid-Open Patent Publication No. 2002-203546

[Patent Document 7] Japanese Laid-Open Patent Publication No. 2001-15106

[Patent Document 8] Japanese Laid-Open Patent Publication No. 2002-289187

[Patent Document 9] Patent Publication No. 3239076

[Patent Document 10] Domestic Re-publication of International Publication No. WO 97/19479

DISCLOSURE OF THE INVENTION

Problem to be Solved by the Invention

The storage characteristics of alkaline batteries including nickel oxyhydroxide in its positive electrode material mixture are still not at a sufficient level even currently, and a further improvement is demanded. Since the improvement by adding an auxiliary to the positive electrode material mixture is limited, as a fundamental improvement to change the active material itself, an application of nickel oxyhydroxide with a higher valence (γ-type structure) is probably promising. However, with such a material, although storage characteristics greatly improve by retarding the decomposition reaction of water (oxygen-generative reaction) in the positive electrode, the oxidation-reduction potential (discharge potential) is lower than β-nickel oxyhydroxide, and the volume change in particles during discharge is large, leading to a problem of a great decline in discharge performance under high-load. It may be detrimental to a great advantage of nickel-manganese batteries or nickel dry batteries, the advantage being excellent discharge performance under high-load by utilizing high-potential and high-conductive nickel oxyhydroxide instead of a positive electrode active material with excessively low utilization at the time of high-load discharge in the case of manganese dioxide, i.e., an alkaline battery.

Means for Solving the Problem

To solve such problems as noted above, an alkaline battery of the present invention comprises a positive electrode including nickel oxyhydroxide as an active material, the nickel oxyhydroxide including a secondary particle, and the secondary particle including a crystal structure mainly composed of γ-type at at least a portion of the surface layer of the secondary particle, and a crystal structure mainly composed of β-type in the inner portion of the secondary particle.

Generally, in nickel oxyhydroxide for use in batteries, primary particles with a size of ten to several hundreds nm aggregate to form a secondary particle. The present invention uses, specifically, nickel oxyhydroxide comprising such a secondary particle with a crystal structure mainly composed of γ-type at at least a portion of the surface layer of the secondary particle, and with a crystal structure mainly composed of β-type in the inner portion of the secondary particle.

Since such nickel oxyhydroxide includes a secondary particle with its surface layer mainly composed of γ-nickel oxyhydroxide less reactive to electrolytes, battery storage characteristics can be improved greatly. Additionally, since such particles involve less volume change during discharge, and exhibit behavior of γ-nickel oxyhydroxide in the inner layer as a discharge reaction, a high-voltage alkaline battery excellent in discharge under high-load can be achieved.

Effect of the Invention

Based on the present invention, the advantage of alkaline batteries with nickel oxyhydroxide added to the positive electrode material mixture, i.e., excellent discharge performance under high-load, can be kept, while achieving a great improvement in storage characteristics that have been a problem so far due to self-discharging in the positive electrode.

BEST MODE FOR CARRYING OUT THE INVENTION

Figure 1:
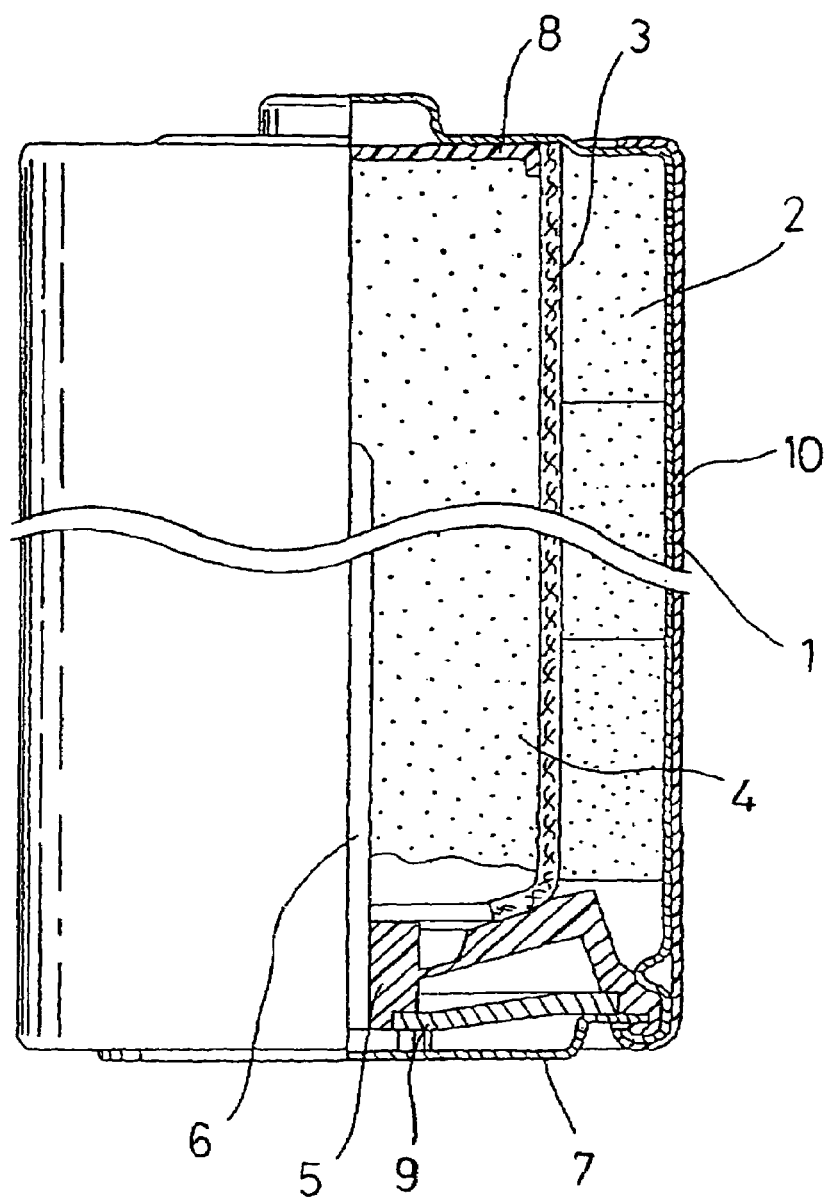
[FIG. 1] A front view of an alkaline battery according to an Example of the present invention, with a partial cross-sectional view.

The present invention relates to an alkaline battery comprising a positive electrode including nickel oxyhydroxide as an active material, wherein the nickel oxyhydroxide comprises a secondary particle, the secondary particle comprising a crystal structure mainly composed of γ-type at at least a portion of a surface layer thereof, and a crystal structure mainly composed of β-type in an inner portion thereof.

The nickel oxyhydroxide may be included in the positive electrode also as tertiary particles or as further higher-order particles, in addition to the secondary particles. In short, it is acceptable as long as the secondary particle is in the form described above.

In a preferable embodiment of the present invention, the nickel oxyhydroxide further has any of/or all of powder properties (1) to (4) below:

(1) a volume-based average particle size measured by using a laser diffraction particle size distribution analyzer is 10 to 20 nm, and a thickness of the γ-nickel oxyhydroxide layer at the secondary particle surface estimated by an X-ray microanalyzer or a transmission X-ray microscope observation is 0.5 μm or less;

(2) in a powder X-ray diffraction, when an integrated intensity of a diffraction peak based on the (003) plane of the γ-nickel oxyhydroxide is Iγ, and an integrated intensity of a diffraction peak based on the (001) plane of the β-nickel oxyhydroxide is Iβ, a ratio of the peak intensity of the γ-nickel oxyhydroxide, Iγ/(Iγ+Iβ), is 0.05 to 0.2;

(3) an average valence of nickel obtained by dissolving the powder in acid and using a dimethylglyoxime method and a redox titration is 3.0 to 3.1; and (4) it is in spherical form and has a tap density (300 times) of 2.0 g/cm$^3$ or more.

In order to achieve the intentions of the present invention, i.e., the surface layer of the nickel oxyhydroxide secondary particle having a structure mainly composed of the γ-type, the reactivity with the electrolyte being less, and the discharge voltage showing behavior of the internal β-type (high-voltage), it is important that the layer mainly composed of the γ-nickel oxyhydroxide at the secondary particle surface be homogeneous, and its thickness be small. Additionally, in view of easy production of positive electrode pellets for an alkaline battery, i.e., in view of moldability, the nickel oxyhydroxide having the above property (1) is preferable.

For another preferable property of the nickel oxyhydroxide, the above (2) may be mentioned.

In order to secure a sufficient discharge capacity, the average valence of nickel in the nickel oxyhydroxide is in the range of the (3) above.

Further, for improving the filling of the nickel oxyhydroxide into a battery, the above property (4) is preferably provided.

In another preferable embodiment of the present invention, the nickel oxyhydroxide forms a solid solution including Mn. When nickel oxyhydroxide or nickel hydroxide, a raw material therefor, forms a solid solution including Mn, the oxidation-reduction potential of the nickel becomes lower. Further, manganese ion (tetravalent) existing in the nickel layer of the nickel oxyhydroxide makes the production of γ-type easier, since it stabilizes the γ-type structure thermodynamically. Taking advantage of such characteristics, in the present invention, solid solution nickel hydroxide including Mn is used as a raw material, and conditions are set so that only the surface layer of the particle is more intensely oxidized in the oxidizing process, to produce the nickel oxyhydroxide with the crystal structure of γ-type only at the surface layer, and the crystal structure of β-type in the inner layer. Thereby, a higher performance in battery is sought after.

In another preferable embodiment of the present invention, the Mn concentration of the nickel oxyhydroxide is low in the inner portion and higher at the surface layer in the secondary particle. When the Mn concentration in the raw material nickel hydroxide is low in the inner layer and higher at the surface layer in the secondary particle, the nickel oxyhydroxide with the γ-type structure only at the surface layer intended in the present invention can be obtained easily without special operations in the oxidizing process.

In a preferable embodiment of the present invention, the Mn concentration in the solid solution nickel oxyhydroxide is in the range of 0.1 to 10 mol % relative to the total amount of Ni and Mn. When the Mn concentration is below 0.1 mol %, the effect of producing the γ-type easily as mentioned in the above cannot come into effect sufficiently. When the Mn concentration is over 10 mol % on the other hand, the nickel amount in the nickel oxyhydroxide decreases relatively, thereby making it difficult to obtain a satisfactory battery capacity. Based on these viewpoints, the Mn concentration in the solid solution nickel oxyhydroxide is set to be in the range of 0.1 to 10 mol %.

In another preferable embodiment of the present invention, the nickel oxyhydroxide forms a solid solution including Al and the Al concentration is low in the inner portion and higher at the surface layer of the secondary particle. When the raw material is the nickel hydroxide solid solution including Al, it is known that anions and water molecules are incorporated between the nickel layers, and an extended structure of $\alpha$-Ni$(OH)_2$ between the layers is stabilized, to thereby form the $\gamma$-type structure by passing of $\alpha \rightarrow \gamma$ in the oxidizing process. Since the $\alpha$-Ni$(OH)_2$ structure formed in the solid solution including Al is low in density and hard to handle, here, a nickel hydroxide material used as the raw material is such that in the secondary particle, the Al concentration is low in the inner portion, i.e., the inner portion is a high-density $\beta$-Ni$(OH)_2$ structure, and the surface layer is high in the Al concentration and easily produces the $\gamma$-type structure. Then, by oxidizing the nickel hydroxide material, the nickel oxyhydroxide with the $\gamma$-type structure only at the surface layer is obtained. Such nickel oxyhydroxide is used for achieving a higher performance battery.

The Al amount in the nickel oxyhydroxide solid solution (measured value for the whole powder) is preferably in the range of 0.1 to 10 mol %. Setting such range is from the same reasons explained for the amount of Mn in the above.

Further, the present invention provides a method for manufacturing a positive electrode material for an alkaline battery, the method comprising the steps of:

a first step of synthesizing $\beta$-Ni$(OH)_2$ by using a reaction crystallization method;

a second step of covering the $\beta$-Ni$(OH)_2$ with a solid solution Ni$(OH)_2$ including Mn or Al in another synthesizing chamber by using the reaction crystallization method; and a third step of chemically oxidizing the obtained composite particle with an oxidizing agent, to transform the composite particle into the nickel oxyhydroxide comprising a secondary particle with $\gamma$-type crystal structure only at a surface layer of the secondary particle, and $\beta$-type crystal structure in an inner portion of the secondary particle.

Based on such process, the intended nickel oxyhydroxide can be produced efficiently and stably.

As is described in Examples below, the present invention can be suitably applied to alkaline batteries including manganese dioxide and nickel oxyhydroxide as positive electrode active materials, and also can be applied to alkaline batteries including only nickel oxyhydroxide as the positive electrode active material. When a mixture of manganese dioxide and nickel oxyhydroxide is used for the positive electrode active material, a preferable mixing ratio of nickel oxyhydroxide to manganese dioxide is in the range of 10 to 80 wt %: 90 to 20 wt %.

EXAMPLE

In the following, the present invention is described in more detail with reference to Examples.

Example 1

(1) Preparation of Raw Material Powder:

Pure water and a small amount of hydrazine (reducing agent) were added into a reaction tank with a stirring blade, and while bubbling with nitrogen gas, a nickel (II) sulfate aqueous solution, a manganese (II) sulfate aqueous solution, a sodium hydroxide aqueous solution, and aqueous ammonia with predetermined concentrations were supplied with a pump in a constant amount so that the pH of the solution in the tank was to be constant. Stirring was continued sufficiently and spherical nickel hydroxide was precipitated and grown. Next, the obtained particles were heated in a sodium hydroxide aqueous solution different from the above to remove sulfate ions, and then washed with water, and dried under vacuum, to obtain raw material spherical nickel hydroxide "a" (composition: Ni$_{0.95}$Mn$_{0.05}$(OH)$_2$)

Additionally, spherical nickel hydroxide "b" (composition: Ni$_{0.97}$Zn$_{0.03}$(OH)$_2$) was obtained in the same manner as the above except that a zinc sulfate (II) aqueous solution was used instead of the manganese (II) sulfate aqueous solution. Nickel hydroxides "a" and "b" had $\beta$-type crystal structure, a volume-based average particle size of 15 µm, a tap density (300 times) of 2.25 g/cm$^3$, and a BET specific surface area of 10 m$^2$/g.

Then, as a chemical oxidation process for spherical nickel hydroxide "a", 200 g of the particles were put into 1 L of a sodium hydroxide aqueous solution, and an oxidizing agent, a sodium hypochlorite aqueous solution (effective chlorine concentration: 10 wt %), was added in a sufficient amount (corresponding to 2 equivalents) and stirred, for converting the nickel hydroxide into nickel oxyhydroxide. The obtained particles were sufficiently washed with water, and dried under vacuum at 60° C. to give a positive electrode powder. A concentration x of the sodium hydroxide aqueous solution to be coexisted with the oxidizing agent, and a reaction atmosphere temperature y were changed variously at this time to obtain nickel oxyhydroxides A1 to A9 as shown in Table 1. For spherical nickel hydroxide "b", the same conditions for x and y for preparing A4 to A6 were selected, and the oxidization was carried out in the same manner as the above, to obtain nickel oxyhydroxides B4 to B6 for comparison.

TABLE 1

| Kind of Nickel Oxyhydroxide | Concentration x of NaOH Aqueous Solution [wt %] | Reaction Atmosphere Temperature y [° C.] |
|---|---|---|
| A1 | 0.1 | 30 |
| A2 | 0.1 | 40 |
| A3 | 0.1 | 50 |
| A4 | 1 | 30 |
| A5 | 1 | 40 |
| A6 | 1 | 50 |
| A7 | 10 | 30 |
| A8 | 10 | 40 |
| A9 | 10 | 50 |
| B4 | 1 | 30 |
| B5 | 1 | 40 |
| B6 | 1 | 50 |

(2) Analysis of Nickel Oxyhydroxide Powder:

As a property analysis of the thus prepared nickel oxyhydroxide powders, first, the crystal structure was identified by a powder X-ray diffraction, and the average nickel valence was measured by a chemical analysis. The powder X-ray diffraction was carried out with the measurement conditions below, and from an integrated intensity I$\gamma$ of the diffraction peak in the proximity of 2$\theta$=13 deg (corresponding to a spacing of about 7 Å) based on the (003) plane of the $\gamma$-type nickel oxyhydroxide, and an integrated intensity I$\beta$ of the diffraction peak in the proximity of 2$\theta$=19 deg (corresponding to a spacing of 4.5 to 5 Å) based on the (001) plane of the $\beta$-type nickel oxyhydroxide, a ratio of the peak intensity of the $\gamma$-nickel oxyhydroxide to the total amount of the nickel oxyhydroxide, I$\gamma$/(I$\gamma$+I$\beta$) was obtained.

The measurement device used here was a powder X-ray diffraction device, "RINT 1400", manufactured by Rigaku Corporation, and the measurement conditions were as follows:
Anode: Cu,
Filter: Ni,
Tube voltage: 40 kV,
Tube current: 100 mA,
Sampling angle: 0.02 deg,
Scanning speed: 3.0 deg/min,
Divergence slit: ½ deg, and
Scattering slit: ½ deg.

The average nickel valence of the nickel oxyhydroxide is obtained by the chemical measurement whose procedures are shown below.

(i) Measurement of Weight Ratio of Metal in Nickel Oxyhydroxide:

To the nickel oxyhydroxide in an amount of 0.05 g, 10 cm$^3$ of concentrated nitric acid was added and dissolved by heating. A tartaric acid aqueous solution in an amount of 10 cm$^3$ was added, and further an ion-exchange water was added, and then the volume was adjusted so that the total amount became 200 cm$^3$. After adjusting the pH of this solution by using aqueous ammonia and acetic acid, 1 g of potassium bromate was added to oxidize manganese ions which may cause a measurement error, so that the manganese ions had a valence of three or more. Then, while this solution was heated and stirred, an ethanol solution of dimethylglyoxime was added, and nickel (II) ions were precipitated as a dimethylglyoxime complex compound. Afterwards, a suction filtration was carried out, the produced precipitate was collected and dried under an ambient temperature of 110° C., and the weight of the precipitate was determined. Based on this operation, the nickel weight ratio included in the active material powder was calculated from the following formula.

nickel weight ratio={weight of precipitate (g)×0.2032}/{active material powder sample weight (g)}

On the other hand, for a quantity determination for the weight ratio of manganese in the nickel oxyhydroxide, an aqueous solution of nitric acid was added to the nickel oxyhydroxide and heated to dissolve the whole amount, and an ICP emission spectroscopy was carried out for the obtained solution (VISTA-RL manufactured by VARIAN, Inc was used).

(ii) Measurement of Average Nickel Valence by Redox Titration:

Potassium iodide in an amount of 1 g and sulfuric acid in an amount of 25 cm$^3$ were added to 0.2 g of the nickel oxyhydroxide, and the nickel oxyhydroxide was completely dissolved by sufficient, continuous stirring. In this process, nickel ions and manganese ions with a higher valence oxidize the potassium iodide to iodine, and nickel and manganese are reduced to a valence of two. After allowing the mixture to stand for 20 minutes, an aqueous solution of acetic acid-ammonium acetate as a pH buffer, and an ion-exchange water were added to stop the reaction, and the produced and separated iodine was titrated with 0.1 mol/L of a sodium thiosulfate aqueous solution. The titrated amount at this time reflects the amount of metal ion with valences of more than two as in the above. Thus, by using the weight ratios of the contained nickel and manganese in (i), and assuming that the manganese in the nickel oxyhydroxide is tetravalent, the average nickel valence of each of the nickel oxyhydroxides was estimated.

Then, the nickel oxyhydroxides were embedded in a resin, a mirror polishing was carried out, and planes of sodium ions were analyzed by an Electron Probe Micro Analyser (EPMA). In this case, sodium ions were selectively contained between the nickel layers of the γ-nickel oxyhydroxide. Thus, based on the plane analysis, distribution of the γ-type structure, that is, the thickness from the secondary particle surface, can be grasped. Additionally, the nickel oxyhydroxides were embedded in a resin and it was cut. The cut plane was polished to produce a thin sample, and an observation was carried out with a transmission electron microscope (TEM) for the outermost plane of the secondary particle. In this case, the γ-nickel oxyhydroxide layer extended between the layers can be distinguished from the β-type structure layer. From these precise analyses, the thickness of the γ-nickel oxyhydroxide layer at the secondary particle surface of each kind of the nickel oxyhydroxides was obtained.

In addition to the measurements above, the average particle size (volume-based) and the tap density (300 times) were measured by using a laser diffraction particle size distribution analyzer. Table 2 shows a summary of the results of these analyses on nickel oxyhydroxides A1 to A9, and B4 to B6.

TABLE 2

| Kind of Nickel Oxyhydroxide | Average Particle Size [μm] | Thickness of γ-type layer [μm] | $I_\gamma/(I_\gamma + I_\beta)$ | Average Nickel Valence | Tap Density [g/cm$^3$] |
|---|---|---|---|---|---|
| A1 | 15 | 0.25 | 0.07 | 3.03 | 2.19 |
| A2 | 14 | N.D. | 0.03 | 2.99 | 2.31 |
| A3 | 14 | N.D. | 0.01 | 2.98 | 2.33 |
| A4 | 15.5 | 0.45 | 0.15 | 3.08 | 2.07 |
| A5 | 15 | 0.35 | 0.09 | 3.05 | 2.15 |
| A6 | 14.5 | N.D. | 0.03 | 2.99 | 2.29 |
| A7 | 18 | 0.90 | 0.29 | 3.15 | 1.92 |
| A8 | 17 | 0.75 | 0.25 | 3.13 | 1.95 |
| A9 | 17 | 0.65 | 0.22 | 3.11 | 1.99 |
| B4 | 14 | N.D. | 0.02 | 2.99 | 2.33 |
| B5 | 14 | N.D. | 0.01 | 2.98 | 2.33 |
| B6 | 14 | N.D. | 0.01 | 2.99 | 2.34 |

N.D.: Not Detected

The results show that with regard to the solid solution sample (A) including Mn, those with a higher concentration x of the sodium hydroxide aqueous solution to be coexisted with the oxidizing agent, i.e., 10 wt % (A7 to A9), production of the γ-nickel oxyhydroxide was remarkable, and the production ratio becomes higher when the reaction ambient temperature y becomes lower. The low concentration x of the sodium hydroxide aqueous solution, i.e., 0.1 to 1 wt %, and the high reaction ambient temperature y produce the β-nickel oxyhydroxide that barely includes the γ-type (A2, A3, and A6). When both of the concentration x of the sodium hydroxide aqueous solution and the temperature y of the reaction atmosphere are low, the β-nickel oxyhydroxide with portions of layers of the γ-nickel oxyhydroxide on the secondary particle surface can be obtained (A1, A4, and A5).

The following are probably related to the causes for such differences.

(i) A higher alkaline concentration renders releasing of protons from nickel hydroxide and entrance of alkaline cations to nickel hydroxide easier at the time of oxidation.

(ii) A lower temperature retards a self-decomposition reaction of sodium hypochlorite, and oxidation depth goes deeper despite the low reaction speed.

On the other hand, the solid solution samples (B) including Zn for comparison are, under any oxidation conditions, the β-nickel oxyhydroxides barely including the γ-type. This shows that for the production of the γ-type structure as described above, it is important to form the solid solution by adding a specific element such as Mn.

(3) Preparation and Evaluation of Alkaline Battery:

Then, the above nickel oxyhydroxides were used to prepare alkaline batteries.

FIG. 1 is a front view of an alkaline battery prepared in this Example, with a partial cross-sectional view. A positive electrode case 1 comprises a nickel-plated steel plate. Inside the positive electrode case 1, a graphite coating-film (not shown) is formed. In the positive electrode case 1, a plurality of short cylindrical positive electrode material mixture pellets 2 mainly composed of manganese dioxide and nickel oxyhydroxide were inserted, and by re-applying pressure to the pellets in the case, the pellets were brought into close contact with the inner face of the case 1. Then, after inserting a separator 3 and an insulating cap 9 inside the positive electrode material mixture pellets 2, an electrolyte was injected to wet the separator 3 and the positive electrode material mixture pellets 2. For the electrolyte, for example, an aqueous solution of 40 wt % potassium hydroxide was used. After the injection, a gelled negative electrode 4 was filled inside the separator 3. The gelled negative electrode 4 comprises, for example, sodium polyacrylate, i.e., a gelling agent, an alkaline electrolyte, and zinc powder, i.e., a negative electrode active material.

Then, to the gelled negative electrode 4, a negative electrode current collector 6 integrally formed with a resin-made sealing plate 5, a bottom plate 7 also functioning as a negative electrode terminal, and an insulating washer 8 was inserted. Then, an opening end of the positive electrode case 1 was crimped to the peripheral portion of the bottom plate 7 with the end of the sealing plate 5 interposed therebetween, to seal the opening of the positive electrode case 1. Afterwards, the outer face of the positive electrode case 1 was covered with an outer label 10. Alkaline batteries were thus completed.

In this Example, first, electrolytic manganese dioxide, nickel oxyhydroxide A1, and graphite were mixed in a weight ratio of 50:45:5. After adding 1 part by weight of the electrolyte to 100 parts by weight of the mixture, the whole mixture was stirred and blended with a mixer homogeneously to give predetermined granules. The obtained granules were pressure-molded to give a hollow cylindrical form, to be regarded as a positive electrode material mixture. For the electrolyte, an aqueous solution of 40 wt % potassium hydroxide was used. By using these, alkaline batteries A1 of AA size shown in FIG. 1 were assembled. Additionally, instead of nickel oxyhydroxide A1, by using nickel oxyhydroxides A2 to A9, and B4 to B6 and setting the amount of the positive electrode material to be charged to the same in all cases, alkaline batteries A2 to A9, and B4 to B6 corresponding to each kind of nickel oxyhydroxides were assembled.

As an evaluation for these batteries, fresh batteries and batteries stored at 60° C. for one week were continuously discharged at a constant current of 1000 mA, i.e., a comparatively high load, at 20° C., and a discharge capacity until reaching an end-voltage of 0.9 V was measured, to determine the capacity retention rate after the storage. The obtained results are summarized and shown in Table 3. The discharge capacity is shown in a relative value, setting the initial discharge capacity of comparative battery B4 as 100.

TABLE 3

| Type of Battery | Kind of Nickel Oxyhydroxide | Initial Discharge Capacity at 1A | Discharge Capacity at 1A after Storage | Capacity Retention Rate after Storage [%] |
|---|---|---|---|---|
| Battery A1 | A1 | 102 | 85 | 83 |
| Battery A2 | A2 | 101 | 78 | 77 |
| Battery A3 | A3 | 101 | 75 | 74 |
| Battery A4 | A4 | 101 | 87 | 86 |
| Battery A5 | A5 | 101 | 85 | 84 |
| Battery A6 | A6 | 101 | 78 | 77 |
| Battery A7 | A7 | 90 | 79 | 88 |
| Battery A8 | A8 | 91 | 79 | 87 |
| Battery A9 | A9 | 92 | 78 | 85 |
| Battery B4 | B4 | 100 (base) | 75 | 75 |
| Battery B5 | B5 | 99 | 75 | 76 |
| Battery B6 | B6 | 100 | 74 | 74 |

In those batteries using samples A7 to A9, in which the γ-nickel oxyhydroxide production was notable, although the capacity retention rates after the storage were high, the capacity was low from the initial stage and sufficient performance could not be achieved, since the oxidation-reduction potential (discharge potential) of the γ-nickel oxyhydroxide was lower than the β-nickel oxyhydroxide, and a volume change in particles during discharge (increase in resistive component) was large. Also, in those batteries using the β-nickel oxyhydroxide barely including γ-type (A2, A3, A6, and B4 to B6), despite the high initial capacity, deterioration from high-temperature storage was remarkable.

In comparison, it is clear that in the batteries of the present invention using the β-nickel oxyhydroxide with the secondary particle surface having portions of the γ-nickel oxyhydroxide layer (A1, A4, and A5), the most excellent performance is achieved with the capacity at the initial stage being high and deterioration after the storage being retarded. The reasons for this may be as follows.

In the above nickel oxyhydroxide, since the outermost layer of the secondary particle is the γ-nickel oxyhydroxide, the volume change during discharge is small, and the behavior of the internal β-nickel oxyhydroxide is shown (high-voltage) in the discharge reaction, achieving a higher capacity from the initial stage. On the other hand, due to less reactivity between the outermost γ-nickel oxyhydroxide and the electrolyte, self-decomposition reaction during storage under high temperatures (oxygen-generative reaction) can be effectively retarded, and the higher capacity is kept after the storage.

Then, from the results of the powder analysis shown in Table 2, it is clear that the nickel oxyhydroxides achieving those excellent characteristics have physical property values.

(i) The average particle size is about 15 μm, and the thickness of the γ-type layer at the particle surface is about 0.5 μm or less.

(ii) The peak intensity ratio of the γ-nickel oxyhydroxide in the powder X-ray diffraction, $I\gamma/(I\gamma+I\beta)$, is 0.05 to 0.2.

(iii) The average nickel valence is 3.0 to 3.1.

(iv) The tap density (300 times) is 2.0 g/cm³ or more.

As shown, based on the present invention, the storage characteristics can be improved greatly while keeping the advantage of alkaline batteries with nickel oxyhydroxide added in the positive electrode material mixture, i.e., excellency in discharge performance under high-load.

Example 2

In this Example, batteries were made and evaluated for clarifying the most appropriate amount of Mn in the solid solution nickel oxyhydroxide.

(1) Preparation of Raw Material Powder:

A spherical solid solution nickel hydroxide including Mn was made by the same reaction crystallization method described in Example 1. At this time, the amount of the manganese (II) sulfate aqueous solution supplied to the reaction tank was adjusted, and as in Table 4, solid solution nickel hydroxides ml to m9 with different Mn concentrations were obtained. These nickel hydroxides ml to m9 had the β-type crystal structure, the volume-based average particle size of about 15 μm, the tap density (300 times) of about 2.2 g/cm³, and the BET specific surface area of about 10 m²/g.

TABLE 4

| Kind of Nickel Hydroxide | Amount of Mn included in Solid Solution [mol %] |
| --- | --- |
| Nickel Hydroxide m1 | 0.05 |
| Nickel Hydroxide m2 | 0.1 |
| Nickel Hydroxide m3 | 0.5 |
| Nickel Hydroxide m4 | 1 |
| Nickel Hydroxide m5 | 3 |
| Nickel Hydroxide m6 | 7 |
| Nickel Hydroxide m7 | 10 |
| Nickel Hydroxide m8 | 12 |
| Nickel Hydroxide m9 | 0 (did not become solid solution) |

Then, 200 g of spherical nickel hydroxide ml was added to 1 L of a sodium hydroxide aqueous solution, and a sufficient amount of a sodium hypochlorite aqueous solution (effective chlorine concentration: 10 wt %), i.e., an oxidizing agent, was added and stirred, to transform the nickel hydroxide into nickel oxyhydroxide. At this time, for the concentration x of the sodium hydroxide aqueous solution and the reaction ambient temperature y, the conditions for A4 in Example 1 (x: 1 wt %, and y: 30° C.) were selected as suitable conditions for preparation of the active material used in the present invention. The obtained particles were sufficiently washed with water, and then dried under vacuum at 60° C. for 24 hours. This is regarded as nickel oxyhydroxide M1. Additionally, in the same manner as in the above except for using spherical nickel hydroxides m2 to m8, corresponding nickel oxyhydroxides M2 to M9 were prepared.

For thus obtained nickel oxyhydroxides M1 to M9, the same powder analysis shown in Example 1 (measurements for the average particle size, the γ-type layer thickness, the $I\gamma/(I\gamma+I\beta)$ ratio, the average nickel valence, and the tap density) was carried out. The results are shown in Table 5.

TABLE 5

| Kind of Nickel Oxyhydroxide | Amount of Mn included in Solid Solution [mol %] | Average Particle Size [μm] | Thickness of γ-type layer [μm] | $I_\gamma/(I_\gamma+I_\beta)$ | Average Nickel Valence | Tap Density [g/cm³] |
| --- | --- | --- | --- | --- | --- | --- |
| M1 | 0.05 | 15 | N.D. | 0.02 | 2.99 | 2.32 |
| M2 | 0.1 | 15 | 0.20 | 0.05 | 3.01 | 2.27 |
| M3 | 0.5 | 16 | 0.25 | 0.07 | 3.02 | 2.24 |
| M4 | 1 | 16 | 0.30 | 0.09 | 3.03 | 2.20 |
| M5 | 3 | 15.5 | 0.40 | 0.12 | 3.06 | 2.16 |
| M6 | 7 | 16 | 0.45 | 0.16 | 3.07 | 2.11 |
| M7 | 10 | 17 | 0.50 | 0.19 | 3.09 | 2.03 |
| M8 | 12 | 18 | 0.60 | 0.26 | 3.12 | 1.95 |
| M9 | 0 (did not become solid solution) | 15 | N.D. | 0.01 | 2.99 | 2.33 |

N.D.: Not Detected (2) Preparation and Evaluation of Alkaline Battery:

Alkaline batteries were made in the same manner as Example 1 by using the above nickel oxyhydroxides M1 to M9.

Electrolytic manganese dioxide, nickel oxyhydroxide M1, and graphite were mixed in a weight ratio of 50:45:5. After adding 1 part by weight of the electrolyte to 100 parts by weight of the mixture and stirred, the obtained granules were pressure-molded to give a hollow cylindrical form. By using the positive electrode material mixture and the electrolyte comprising an aqueous solution of 40 wt % potassium hydroxide, aline batteries M1 of AA size shown in FIG. 1 were assembled. Additionally, instead of nickel oxyhydroxide M1, by using nickel oxyhydroxides M2 to M9, and setting the amount of the positive electrode material to be charged to the same in all cases, alkaline batteries M2 to M9 corresponding to each kind of nickel oxyhydroxides were assembled.

As an evaluation for thus prepared batteries M1 to M9, fresh batteries and batteries stored at 60° C. for one week were continuously discharged at a constant current of 1000 mA and at 20° C., and a discharge capacity until reaching an end-voltage of 0.9 V was measured, to determine the capacity retention rate after the storage. The obtained results are summarized and shown in Table 6. The discharge capacity is shown in a relative value, setting the initial discharge capacity of comparative battery B4 in Example 1 as 100.

TABLE 6

| Type of Battery | Kind of Nickel Oxyhydroxide | Amount of Mn included in Solid Solution [mol %] | Initial Discharge Capacity at 1A | Discharge Capacity at 1A after Storage | Capacity Retention Rate after Storage [%] |
| --- | --- | --- | --- | --- | --- |
| Battery M1 | M1 | 0.05 | 101 | 76 | 75 |
| Battery M2 | M2 | 0.1 | 102 | 83 | 81 |
| Battery M3 | M3 | 0.5 | 101 | 84 | 83 |
| Battery M4 | M4 | 1 | 102 | 85 | 83 |
| Battery M5 | M5 | 3 | 102 | 85 | 83 |
| Battery M6 | M6 | 7 | 102 | 84 | 82 |
| Battery M7 | M7 | 10 | 101 | 84 | 83 |
| Battery M8 | M8 | 12 | 94 | 79 | 84 |
| Battery M9 | M9 | 0 (did not become solid solution) | 101 | 75 | 74 |

The results show that higher performance can be achieved for both the initial stage and after storage in the case of batteries (M2 to M7) using the sample in which the Mn concentration was regulated to the range of 0.1 to 10 mol %, and the γ-type layer thickness at the secondary particle surface and the γ-type structure ratio were controlled appropriately. In M1 and M9 with excessively low Mn concentrations, the β-nickel oxyhydroxide without γ-type layer at the particle surface was obtained: therefore, despite excellent initial performance, deterioration during storage is significant. In M8 with an excessively high Mn concentration, it is difficult to obtain a higher capacity in the initial stage, due to the excessive γ-type structure in addition to relative decrease in the Ni amount in the nickel oxyhydroxide.

As shown, in the present invention, it is effective to set the amount of Mn to be added to the nickel oxyhydroxide or to the raw material spherical nickel hydroxide to be in the range of 0.1 to 10 mol %. Additionally, the results of the powder analysis in Table 5 also show that the nickel oxyhydroxide achieving excellent characteristics have the following physical property values.

(i) The average particle size is about 15 μm, and the thickness of the γ-type layer at the secondary particle surface is about 0.5 μm or less.
(ii) The peak intensity ratio of the γ-nickel oxyhydroxide in the powder X-ray diffraction, $I\gamma/(I\gamma+I\beta)$, is 0.05 to 0.2.
(iii) The average nickel valence is 3.0 to 3.1, and (iv) the tap density (300 times) is 2.0 g/cm$^3$ or more.

Example 3

In this Example, examinations were carried out for the case when a spherical solid solution nickel hydroxide with different elements (Mn, Al) added to the secondary particle surface was used as the raw material.

(1) Preparation of Raw Material Powder Synthesis:

Synthesis (i):

A nickel (II) sulfate aqueous solution, a sodium hydroxide aqueous solution, and aqueous ammonia with predetermined concentrations were prepared, and supplied with a pump to a reaction tank with a stirring blade in a constant amount so that the pH of the solution in the tank was to be constant. The stirring was continued sufficiently and a spherical nickel hydroxide (β-type, no different element included in the solid solution) was precipitated and grown. Next, the obtained particles were placed in a synthesizing chamber (nitrogen atmosphere) different from the above, and a nickel (II) sulfate aqueous solution, a manganese (II) sulfate aqueous solution, a sodium hydroxide aqueous solution, and aqueous ammonia with predetermined concentrations were supplied with a pump in a constant amount so that the pH of the solution in the tank was to be constant. The stirring was continued sufficiently and a solid solution nickel hydroxide including Mn (β-type, thickness of about 0.5 μm) was precipitated and grown at the secondary particle surface. Thus obtained composite material was heated in a sodium hydroxide aqueous solution to remove sulfate ions, washed with water and dried to be regarded as composite nickel hydroxide "c". Based on a laser diffraction particle size distribution analyzer, the volume-based average particle size of composite nickel hydroxide "c" was 15 μm, the BET specific surface area was 12 m$^2$/g, the tap density was 2.20 g/cm$^3$, and the Mn content in the whole composite nickel hydroxide was 3 mol %.

Synthesis (ii):

A spherical nickel hydroxide (β-type) not including a different element was precipitated and grown in the same manner as synthesis (i). Then, the obtained particles were placed in another synthesizing chamber, and a nickel (II) sulfate aqueous solution, an aluminum (III) sulfate aqueous solution, a sodium hydroxide aqueous solution, and aqueous ammonia with predetermined concentrations were supplied with a pump in a constant amount so that the pH of the solution in the tank was to be constant. The stirring was continued sufficiently and a solid solution nickel hydroxide including Al (α-type, thickness of about 0.5 μm) was precipitated and grown at the secondary particle surface. Based on a laser diffraction particle size distribution analyzer, thus obtained composite material was sufficiently washed with water and dried to be regarded as composite nickel hydroxide "d". The volume-based average particle size of composite nickel hydroxide "d" was 15 μm, the BET specific surface area was 12 m$^2$/g, the tap density was 2.10 g/cm$^3$, and the Al content in the whole composite nickel hydroxide was 3 mol %.

Then, as a chemical oxidation process for composite nickel hydroxide "c", 200 g of the particles were put into 1 L of a sodium hydroxide aqueous solution, and an oxidizing agent, i.e., a sodium hypochlorite aqueous solution (effective chlorine concentration: 10 wt %), was added in a sufficient amount (corresponding to 2 equivalents) and stirred, for converting the composite nickel hydroxide into nickel oxyhydroxide. The obtained particles were sufficiently washed with water, and dried under vacuum at 60° C. to give a positive electrode powder. A concentration x of the sodium hydroxide aqueous solution to be coexisted with the oxidizing agent, and a reaction atmosphere temperature y at this time were set in combinations as shown in Table 7, to obtain nickel oxyhydroxides C1 to C4 corresponding to respective conditions (1 to 4). Also, for composite nickel hydroxide "d", and a nickel hydroxide without the composing process to the secondary particle surface (named e), oxidizations were carried out with the exact same procedure as the above under respective conditions (1 to 4), and corresponding nickel oxyhydroxides D1 to D4, and E1 to E4 were obtained.

TABLE 7

| Oxidization Condition | Concentration x of Coexisting NaOH solution [wt %] | Reaction Atmosphere Temperature y [° C.] |
| --- | --- | --- |
| 1 | 0.1 | 30 |
| 2 | 0.1 | 40 |
| 3 | 0.1 | 50 |
| 4 | 1 | 30 |

For thus obtained nickel oxyhydroxides C1 to C4, D1 to D4, and E1 to E4, the same powder analysis as shown in Example 1 (measurements of the average particle size, the thickness of the γ-type layer, the ratio $I\gamma/(I\gamma+I\beta)$, the average nickel valence, and the tap density) were carried out. The results are summarized and shown in Table 8. It shows that when composite nickel hydroxides "c" and "d" were used as the raw material, each property value was within the appropriate range under any oxidation condition, and the production of the intended material, that is, a material in which only the outermost layer of the nickel oxyhydroxide secondary particle is the γ-type structure, is easy. On the other hand, when nickel hydroxide "e" without the composing process to the secondary particle surface was used as the raw material, the material became β-NiOOH barely including γ-type structure under any oxidation condition.

TABLE 8

| Kind of Nickel Oxyhydroxide | Element Included at Surface of Solid Solution | Oxidation Condition | Average Particle Size [μm] | Thickness of γ-type layer [μm] | $I_\gamma/(I_\gamma + I_\beta)$ | Average Nickel Valence | Tap Density [g/cm³] |
|---|---|---|---|---|---|---|---|
| C1 | Mn | Cond. 1 | 15 | 0.40 | 0.10 | 3.05 | 2.15 |
| C2 | Mn | Cond. 2 | 15 | 0.45 | 0.12 | 3.07 | 2.13 |
| C3 | Mn | Cond. 3 | 15.5 | 0.40 | 0.09 | 3.05 | 2.19 |
| C4 | Mn | Cond. 4 | 15 | 0.45 | 0.10 | 3.06 | 2.14 |
| D1 | Al | Cond. 1 | 15.5 | 0.40 | 0.10 | 3.05 | 2.05 |
| D2 | Al | Cond. 2 | 15 | 0.45 | 0.12 | 3.06 | 2.04 |
| D3 | Al | Cond. 3 | 15 | 0.45 | 0.13 | 3.06 | 2.03 |
| D4 | Al | Cond. 4 | 15.5 | 0.40 | 0.11 | 3.05 | 2.06 |
| E1 | None | Cond. 1 | 14 | N.D. | 0.01 | 2.98 | 2.35 |
| E2 | None | Cond. 2 | 14.5 | N.D. | 0.01 | 2.98 | 2.35 |
| E3 | None | Cond. 3 | 14 | N.D. | 0.03 | 2.99 | 2.31 |
| E4 | None | Cond. 4 | 14 | N.D. | 0.02 | 2.99 | 2.33 |

N.D.: Not Detected (2) Preparation and Evaluation of Alkaline Battery:

Alkaline batteries were made in the same manner as Example 1 by using the above nickel oxyhydroxides C1 to C4, D1 to D4, and E1 to E4.

Electrolytic manganese dioxide, nickel oxyhydroxide C1, and graphite were mixed in a weight ratio of 50:45:5. After adding 1 part by weight of the electrolyte to 100 parts by weight of the mixture and stirred, the obtained granules were pressure-molded to give a hollow cylindrical form. By using the positive electrode material mixture and the electrolyte comprising an aqueous solution of 40 wt % potassium hydroxide, alkaline batteries C1 of AA size shown in FIG. 1 were assembled. Additionally, instead of nickel oxyhydroxide C1, by using nickel oxyhydroxides C2 to C4, D1 to D4, and E1 to E4, and setting the amount of the positive electrode material to be charged to the same in all cases, alkaline batteries C2 to C4, D1 to D4, and E1 to E4 corresponding to each kind of nickel oxyhydroxides were assembled.

As an evaluation for thus prepared 12 types of batteries, fresh batteries and batteries stored at 60° C. for one week were continuously discharged at a constant current of 1000 mA and at 20° C., and a discharge capacity until reaching an end-voltage of 0.9 V was measured, to determine the capacity retention rate after the storage. The obtained results are summarized and shown in Table 9. The discharge capacity is shown in a relative value, setting the initial discharge capacity of comparative battery B4 in Example 1 as 100.

TABLE 9

| Type of Battery | Kind of Nickel Oxyhydroxide | Initial Discharge Capacity at 1A | Discharge Capacity at 1A after Storage | Capacity Retention Rate after Storage [%] |
|---|---|---|---|---|
| Battery C1 | C1 | 101 | 85 | 84 |
| Battery C2 | C2 | 102 | 84 | 82 |
| Battery C3 | C3 | 101 | 86 | 85 |
| Battery C4 | C4 | 102 | 86 | 84 |
| Battery D1 | D1 | 101 | 85 | 84 |
| Battery D2 | D2 | 101 | 84 | 83 |
| Battery D3 | D3 | 102 | 85 | 83 |
| Battery D4 | D4 | 102 | 85 | 83 |
| Battery E1 | E1 | 99 | 74 | 75 |
| Battery E2 | E2 | 100 | 75 | 75 |
| Battery E3 | E3 | 100 | 75 | 75 |
| Battery E4 | E4 | 100 | 74 | 74 |

The results show that better performance was achieved for the initial stage and after the storage, in those batteries using nickel oxyhydroxides (C1 to C4, and D1 to D4) made to give the γ-type structure only at the outermost layer of the secondary particle from the composite nickel hydroxide as the raw material. As in Examples 1 and 2, the nickel oxyhydroxides of the above achieve a high capacity from the initial stage, since the volume change during discharge is small, and as the discharge reaction, the behavior of the internal β-nickel oxyhydroxide is shown (high-voltage). On the other hand, the self-decomposition reaction (oxygen-generative reaction) under high-temperature storage is also effectively retarded probably because of less reactivity of the outermost γ-nickel oxyhydroxide and the electrolyte.

On the other hand, in comparative nickel oxyhydroxides (E1 to E4), due to the β-nickel oxyhydroxide without the γ-type layer at the surface of the secondary particle, in those batteries using such nickel oxyhydroxides, despite excellent initial performance, deterioration upon storage is significant.

As shown, based on the present invention, storage characteristics can be improved greatly while keeping the advantage of alkaline batteries with nickel oxyhydroxide added to the positive electrode material mixture, i.e., excellent discharge performance under high-load.

In the above Examples, the spherical nickel oxyhydroxide with the volume-based average particle size of about 15 μm was used in all cases. However, the form of the particles does not have to be spherical, and as to the particle size, in view of moldability of positive electrode material mixture pellets, the range of 10 to 20 μm is appropriate. Upon preparation of the positive electrode material mixture, although the mixing ratio of the electrolytic manganese dioxide, the nickel oxyhydroxide, and the graphite conductive agent was 50 wt %: 45 wt %: 5 wt %, the present invention is not limited to such a proportion. Additionally, upon battery production, similar improvement in performance can be achieved by adding a small amount of additives such as ZnO and $Y_2O_3$ in the positive electrode material mixture, for improving storage characteristics.

In Example 3, although the solid solution nickel hydroxide including Mn or Al was precipitated on the nickel hydroxide without including a different element in preparation of the raw material (composite nickel hydroxide), with a solid solution including a small amount of a different element in the inner layer of the nickel hydroxide as well, similar effects can be achieved. At this time, for example, when the inner layer of the nickel hydroxide includes Mn and a nickel hydroxide including a different concentration of Mn is to be precipitated, the Mn concentration can be adjusted so that the inner part of the particle is low in concentration, and higher at the surface layer. Also, in view of results of Example 2, the Mn or Al amount in the composite particles (value in whole powder) is probably appropriate when it is in the range of 0.1 to 10 mol %.

In Examples, the batteries made were alkaline dry batteries with so-called inside-out structure, in which cylindrical positive electrode material mixture pellets, a separator, and a negative electrode zinc gel were disposed in a cylindrical positive electrode case. However, the present invention can as well be applied to alkaline batteries with other structure, such as button-type and rectangular-type.

INDUSTRIAL APPLICABILITY

Based on the present invention, the advantage of alkaline batteries with nickel oxyhydroxide added to the positive electrode material mixture, i.e., excellence in discharge performance under high-load, can be kept, and further, the conventional problem of storage characteristics can be improved greatly. Therefore, the present invention is effective in that application of alkaline primary batteries such as nickel-manganese batteries and nickel dry batteries is further expanded.

The invention claimed is:

1. An alkaline primary battery comprising:
a positive electrode;
a negative electrode;
a separator for separating the both electrodes; and
an alkaline electrolyte,
wherein said positive electrode includes nickel oxyhydroxide comprising a secondary particle as an active material,
said secondary particle comprising a crystal structure mainly composed of γ-type at at least a portion of a surface layer of said secondary particle, and a crystal structure mainly composed of β-type in an inner portion of said secondary particle.

2. The alkaline primary battery in accordance with claim 1, wherein said nickel oxyhydroxide has as least one of properties (1) to (4) below:

(1) a volume-based average particle size measured by using a laser diffraction particle size distribution analyzer is 10 to 20 μm, and a thickness of the γ-nickel oxyhydroxide layer at the secondary particle surface estimated by an X-ray microanalyzer or a transmission X-ray microscope observation is 0.5 μm or less;
(2) in a powder X-ray diffraction, when an integrated intensity of a diffraction peak based on the (003) plane of the γ-nickel oxyhydroxide is Iγ, and an integrated intensity of a diffraction peak based on the (001) plane of the β-nickel oxyhydroxide is Iβ, a ratio of the peak intensity of the γ-nickel oxyhydroxide, Iγ/(Iγ+β), is 0.05 to 0.2;
(3) an average valence of nickel obtained by dissolving the powder in acid and using a dimethylglyoxime method and a redox titration is 3.0 to 3.1; and
(4) it is in spherical form and has a tap density (300 times) of 2.0 g/cm³ or more.

3. The alkaline primary battery in accordance with claim 1, wherein said nickel oxyhydroxide forms a solid solution including Mn.

4. The alkaline primary battery in accordance with claim 3, wherein a Mn concentration in said solid solution is low in the inner portion and higher at the surface layer of the secondary particle.

5. The alkaline primary battery in accordance with claim 3, wherein the Mn concentration included in said solid solution is in the range of 0.1 to 10 mol % relative to a total amount of Ni and Mn.

6. The alkaline primary battery in accordance with claim 1, wherein said nickel oxyhydroxide forms a solid solution including Al, and an Al concentration is low in the inner portion and higher at the surface layer of the secondary particle.

7. The alkaline primary battery in accordance with claim 6, wherein the Al concentration included in said solid solution is in the range of 0.1 to 10 mol % relative to a total amount of Ni and Al.

8. A method for manufacturing a positive electrode material for an alkaline primary battery, the method comprising the steps of:
synthesizing β-Ni(OH)₂ by using a reaction crystallization method;
covering said β-Ni(OH)₂ with a solid solution Ni(OH)₂ including Mn or Al in another synthesizing chamber by using the reaction crystallization method to prepare a composite particle; and
chemically oxidizing the obtained composite particle with an oxidizing agent, to transform the composite particle into nickel oxyhydroxide comprising a secondary particle with γ-type crystal structure only at a surface layer of the secondary particle, and β-type crystal structure in an inner portion of the secondary particle.

* * * * *